Patented Dec. 15, 1953

2,662,860

UNITED STATES PATENT OFFICE 2,662,860

METHOD FOR THE PRODUCTION OF MOLDED ALUMINA CARRIER AND CATALYST

Willem Frederik Engel and Pieter Krijger, Amsterdam, Netherlands, assignors to Shell Development Company, San Francisco, Calif., a corporation of Delaware No Drawing. Application November 28, 1950, Serial No. 198,021

Claims priority, application Netherlands November 30, 1949

5 Claims. (Cl. 252—442)

This invention relates to a process for the production of molded particles consisting essentially of aluminum oxide, and particularly bauxite, which are a suitable catalyst carrier, and also for the production of catalysts by the impregnation of such carrier.

It is known that catalysts can be prepared using aluminum oxide as a base. British patent specifications Nos. 445,727 and 445,757 describe, among other things, that bauxite is broken into particles which are then impregnated with a solution of aluminum chloride. According to these specifications the bauxite is first ground with water and then calcined at red heat. This removes the water of hydration and produces an activated bauxite mass which may be broken up to give particles having some small mechanical strength.

It is usual to heat aluminum oxide containing carrier materials to activate them and bring the aluminum oxide to the gamma form by removal of the hydrate water. Impregnation with catalytically active components is generally effected after heating the carrier material.

This invention aims at preparing strong and better catalyst particles which are obtained by compressing pulverized material. So far applicant has prepared suitable molded particles by the method described in copending application Serial No. 82,285 filed March 18, 1949 (now abandoned), which method, briefly stated, comprises the steps of activating a hydrated alumina, e. g. bauxite, by calcining at about 500° C., heating the activated material with aqueous hydrochloric acid, drying and calcining, pulverizing the activated material, impregnating the powder with one or more solutions of the salt of a catalytically active metal or a solution of a number of salts, drying the impregnated material, compressing it into pellets and then heating to decompose the impregnated salts. In this manner strong catalyst pellets or particles can be obtained because in the process of compressing and/or calcining the impregnated pellets, the impregnated salt imparts some sort of luting. However, the process involves a great number of operations which cause the cost of the finished catalyst to be excessive. However, when it was tried to eliminate one or more of the steps the product was either of lower activity or of insufficient mechanical strength. It would be desirable to substitute the relatively inexpensive extrusion method for the tableting method for producing the pellets, but the pellets produced by extrusion were of lesser mechanical strength.

We have now found that very strong molded alumina particles which are particularly suitable as a catalyst carrier may be obtained in a simpler and more efficient manner if materials consisting essentially of or containing alumina trihydrate in a natural or synthetic form, e. g. natural bauxite, is first pulverized, mixed with a solution of an aluminum salt, and the resulting mass extruded into pellets which are dried and heated to a temperature above 200° C., particularly to 400–800° C.

If the powder impregnated with the aluminum salt is in the form of a paste it can be compressed into strands by means of an extrusion press and the strands can if desired be cut or broken into small pieces. On the other hand, if the powder impregnated with the aluminum salt is dried it can be formed into suitable pellets in a punch and die machine.

The most suitable aluminum salts for the production of the molded particles are the normal salts of the strong acids, particularly aluminum chloride. Other salts, including aluminum sulfate, however, may also be used.

The quantity of salt should be preferably such that per 100 parts of carrier material, more than 1 part of aluminum salt is added, preferably more than 2 parts, for example 3–6 parts.

When heating above 200° C. the water of hydration is expelled and can then react with the aluminum salt. If the heating is carried out at 400–800° C. the alumina is converted into the gamma form and substantially all of the bound water is expelled while, moreover, agglomeration occurs. At the same time the added aluminum salt can react with water forming oxy salts. As a result the carrier material produced in this manner is different from the material known so far which is obtained by impregnating dehydrated or partially dehydrated aluminum oxide with aluminum chloride.

While the general outline of the method has been described above, certain particulars in the method require attention. It is essential that the alumina, e. g. bauxite, be in the natural, trihydrate form. If the material is first partially dehydrated, the pellets are of very poor mechanical strength. Thus, for example, when pellets were prepared as described in Example I below, with the same bauxite which had, however, been first partially dehydrated to a water content of about 13.7% the crushing strength was found to be only about 2.5 kilograms.

The particle size of the ground undehydrated bauxite also plays an important part. Our experience is that a fine powder is more suitable than a coarse one because the former gives pellets of greater mechanical strength. The percentage of particles retained on a 70 mesh ASTM sieve should be kept as low as possible. For example, of two powders A and B with the following screen analyses, powder A yielded pellets which after heating had a crushing strength of 15 kilograms, whereas with powder B, not only did the extrusion present difficulties, but the pellets were very brittle and their crushing strength was only 7 kilograms.

Screen analyses:

|  | A | B |
|---|---|---|
|  | Percent by Weight Retained |  |
| ASTM sieve: |  |  |
| 20 | 0 | 0 |
| 30 | 0-1 | 0-1 |
| 40 | 1 | 3 |
| 50 | 8 | 9 |
| 70 | 12 | 19 |
| 80 | 4 | 5 |
| 100 | 6 | 5 |
| 200 | 22 | 18 |
| 325 | 10 | 5 |
| <375 | 35 | <34 |

The strongest and most uniform pellets are obtained if in the described process the hydrated alumina is ground to a grain size which is less than 0.5 mm. and graded so that at least 5% by weight is of particle size larger than 210 microns and from 30 to 60% by weight is smaller than 74 microns.

The influence of the size of grain will be illustrated in more detail by means of a number of examples.

Bauxite containing hydrate water, in the form in which it is technically obtained, was powdered by means of a disintegrator and then sieved. The disintegrator was fitted with a sieve with openings of 0.5 mm. The powder passed through this sieve was then examined to ascertain the distribution of quantities of powder of a certain particle size and this was done by means of a number of sieves of increasing fineness.

It was found that the composition of the powder was as follows:

Per cent by weight
Quantity of particles larger than 420 microns ------------------------------ 0
Quantity of particles larger than 297 microns ------------------------------ 0.3
Quantity of particles larger than 210 microns ------------------------------ 11.1
Quantity of particles larger than 177 microns ------------------------------ 4.7
Quantity of particles larger than 149 microns ------------------------------ 7.9
Quantity of particles larger than 74 microns ------------------------------ 20.4
Quantity of particles larger than 44 microns ------------------------------ 17.5
Quantity of particles smaller than 44 microns ------------------------------ 38.1

This powder was kneaded with 26% by weight of a 16% $AlCl_3$ solution, so that a product was obtained that contained 4.2% of $AlCl_3$ on bauxite. By means of an extrusion press the paste obtained, which was found very easy to work up, was extruded in the form of strands with a cross section of 6 mm.

The strands were dried in the air for 8 hours at 20° C. and afterwards heated within a period of 5 hours to 120° C. and kept at this temperature for 8 hours. The strands were then cut into pieces 4 mm. in length. These pieces were heated within a period of 6 hours to 500° C. and kept at this temperature for 2 hours.

The pieces were then tested for strength. To this end 20 cm.$^3$ of the pieces were put into a cylindrical vessel with a bottom surface of 6 cm.$^2$, and pressure was exerted for 3 minutes on the pieces by means of a covering layer of brass cylinders of a similar shape and a plate fitting into the cylinder. The quantity of powder formed during a number of tests carried out successively in duplicate at ever-increasing pressure, in which, for each subsequent test, the powder already formed was added to the pieces again, was found to amount to:

Per cent by weight
At 20 kg. pressure 0.10% by weight-------- 0.11
At 40 kg. pressure 0.26% by weight-------- 0.28
At 60 kg. pressure 0.8% by weight--------- 0.9
At 80 kg. pressure 2.6% by weight--------- 3.0
At 100 kg. pressure 6.5% by weight-------- 7.5

If the particles larger than 210 microns were separated from the powder obtained from the disintegrator, so that the content of particles smaller than 74 microns amounted to 63% by weight, the quantities of powder found on measuring the strength of the mouldings finally obtained in the way described, amounted to 0.15, 0.8, 3.5, 10 and 22% by weight, at pressures of 20, 40, 60, 80 and 100 kg. respectively.

If the particles smaller than 74 microns were applied, the content of particles smaller than 44 microns amounted to 68.6% by weight. The strength of the mouldings finally obtained from this powder was found to be approximately equal to the strength of those obtained in the preceding test.

The water content of the paste before extruding also has an influence on the ultimate strength of the pellets. If the water content is high the pellets will be relatively weak; if it is low there will be trouble during extrusion and the pellets will be weak all the same. In general, quantities of water should be used of 12–20% weight calculated on alumina containing hydrate water.

Bauxite powder having the above-given screen analysis was kneaded whilst adding 21% by weight of water, in which 4.2% by weight of $AlCl_3$, calculated on bauxite, had been dissolved. Another portion of the powder was kneaded whilst adding only 15.8% by weight of water in which 4.2% by weight of $AlCl_3$, calculated on bauxite, had been dissolved. The pastes obtained were extruded into the form of strands by means of an extrusion press. The strands were dried in the air for 8 hours at 20° C. and afterwards heated within a period of 5 hours to 120° C. and kept at this temperature for 8 hours. The strands were then cut into 4 mm.-pieces. The pieces obtained were heated within a period of 6 hours to 500° C. and kept at this temperature for 2 hours. The pieces were then tested for strength.

The strength of the pieces finally obtained was nearly twice as great in the second case as in the first and the force necessary to break one piece amounted to 15 kg. Furthermore, it was found that the tendency to form powder was greatly reduced. In order to determine this 20 cm.³ of the pieces were put into a cylindrical vessel with a bottom surface of 6 cm.² and pressure was exerted for 3 minutes on the pieces by means of a covering layer of brass cylinders of a similar shape and a plate fitting into the cylinder. In a series of tests the quantity of powder formed by ever-increasing pressure was determined; for each successive test the powder already formed was added to the pieces again.

The following quantities were found for the pieces obtained with the two pastes described:

|  | 21% H₂O | 15.8% H₂O |
|---|---|---|
| Quantity of powder at a pressure of: |  |  |
| 20 kg. per 6 cm.² | 0.10 | 0.08 |
| 40 kg. per 6 cm.² | 0.26 | 0.15 |
| 60 kg. per 6 cm.² | 0.8 | 0.26 |
| 80 kg. per 6 cm.² | 2.6 | 0.75 |
| 100 kg. per 6 cm.² | 6.5 | 2.0 |

On the basis of experience gained in extruding bauxite powder we used the following procedure: Bauxite powder of suitable screen analysis is mixed with so much aqueous aluminum solution that the extrusion product has a smooth appearance. If the latter product has a granular surface the paste contains too little water, if the product leaving the extruder orifice bends downward at once if not supported, the paste contains too much water. The correct amount of water is present when the extruded product has a smooth appearance and can be handled without losing its shape and without sticking to the hand. Satisfactory results have been obtained with a paste of the following composition:

|  | Per cent weight |
|---|---|
| Surinam bauxite | 79.0 |
| AlCl₃ | 3.3 |
| H₂O | 17.7 |

The Surinam bauxite has the following composition:

|  | Per cent |
|---|---|
| Al₂O₃ | 61.66 |
| SiO₂ | 3.69 |
| Fe₂O₃ | 0.85 |
| TiO₂ | 1.66 |
| Loss on ignition | 32.14 |
| Moisture | 1.40 |

In the above statement of the composition of the paste the water bound to the bauxite is not included. It is perhaps needless to say that calcining of the bauxite to lower its water content gives a useless product.

The method of drying and calcining the pellets also requires attention. If the pellets are dried too fast after extrusion they will show cracks that lower the mechanical strength. It is preferred to heat the mouldings obtained by pressing in the form of strands or pastilles, after they have been dried, to the temperature at which the bound hydrate water is just set free and, only when no more, or nearly no more water is set free, heating the mouldings to a temperature of 400–800° C., in order to obtain gamma alumina. After being dried, the mouldings can, for example, first be heated, for a few hours at 200 to 300° C., for example at 250° C., and afterwards at 500° C.

The influence of the method of drying and heating will be illustrated in more detail with reference to a number of examples.

Bauxite powder having the above-given screen analysis was kneaded mechanically for 10 minutes whilst adding 15.8% by weight of water, in which 4.2% by weight of AlCl₃, calculated on bauxite, had been dissolved. The paste obtained was extruded in the form of strands by means of an extrusion press. These were dried in the air for 8 hours at 20° C. and afterwards heated within a period of 5 hours up to 120° C. and kept at this temperature for 8 hours. The strands were then cut into 4 mm.-pieces. The pieces obtained were then heated in two different ways. One part (A) was heated in the course of 6 hours up to a temperature of 500° C., and then kept at 500° C. for 2 hours. Another part (B) was first heated in the course of 2 hours to 250° C. and then kept for 5 hours at this temperature, after which it was heated in the course of 2 hours to 500° C. and kept for 2 hours at 500° C. According to this latter method of working bound hydrate water is slowly expelled before the pieces are heated to 500° C. In this way stronger pills are obtained than by the first method of heating, as will be seen from the figures given in the table below regarding the strength and the quantities of powder which form under increasing pressures.

In order to determine the powder-forming tendency, 20 cm.³ of the pieces were placed in a cylindrical vessel with a bottom surface of 6 cm.² and pressure was exerted for 3 minutes on the pieces by means of a covering layer of brass cylinders of a similar shape and a plate fitting into the cylinder. In a series of tests the quantity of powder formed by ever-increasing pressure was determined, whereas for each successive test the powder already formed was added to the pieces again.

The following quantities were found in respect of the pieces obtained in the two ways described:

|  | Portion A | Portion B |
|---|---|---|
| Quantity of powder at a pressure of: |  |  |
| 20 kg. per 6 cm.² | 0.08 | 0.01 |
| 40 kg. per 6 cm.² | 0.15 | 0.02 |
| 60 kg. per 6 cm.² | 0.26 | 0.04 |
| 80 kg. per 6 cm.² | 0.75 | 0.16 |
| 100 kg. per 6 cm.² | 2.00 | 0.45 |
| Force needed to break 1 piece_____kg__ | 15 | 17.5 |

We recommend the following drying procedure. The pellets obtained after extrusion are dried for 8 hours in the air at about 20° C. and then for 8 hours at 110° C. The pellets are then already quite strong mechanically. However, as contact with water reduces this mechanical strength (which is not desirable in view of the following impregnation with active material) calcination at a higher temperature is necessary. This is effected by slowly raising the temperature from 110° C. to 500° C. (6 hours) and then keeping it constant for 2 hours while air or nitrogen is passed over the pellets. The pellets are then resistant to water. The calcination may be varied when the mass is calcined. At 200° C. or somewhat above, it loses some water and becomes water resistant. At higher temperatures, e. g. 400–800° C., substantially all of the water is lost and the alumina is converted to gamma alumina. This is the preferred form when preparing catalyst promoted with cobalt and molybdenum. However, dehydration to an intermediate water content of, for example, 5–15% can be applied.

With the aid of the above particles it is possible to produce excellent catalysts by impregnation with a salt solution and decomposition of the impregnated salt by a heat treatment.

This new process has certain advantages over the known methods. When hydrated aluminum oxide, for example in the form of bauxite, is mixed with a solution of an aluminum salt a mass is obtained which after being molded and dried becomes hard and has a great mechanical strength.

As pointed out above, the alumina trihydrate is mixed in the form of a powder with a solution of an aluminum salt to form, for example, a paste which is compressed into particles of any desired shape. It is known, e. g. from the cited British patent specifications, that particles of bauxite may be impregnated with an aluminum chloride solution, but these particles have been obtained by breaking coarse particles and then sieving. In contrast to the process of my invention, this has the disadvantage that the greater part of the initial material which is obtained in the form of a powder cannot be used. Moreover, it is impossible to obtain really strong particles.

Since a catalyst prepared according to the invention is cheaper than a catalyst of equivalent mechanical strength produced by the older more involved method it also follows that the process in which the catalyst is used is more economical while, moreover, there is only a slight degree of pulverization of the catalyst after use owing to its great mechanical strength. Consequently, such a process can be carried out over a long period without the risk of the reactor being clogged by catalyst powder.

It was surprising to find that also a more active catalyst is obtained if the formed carrier particles are soaked in a solution of salts of catalytically active metals and are decomposed by heating in order to obtain the catalytically active form. Although no definite explanation can be given for the increased activity of the catalyst, the possibility may be pointed out that when the impregnated metal salts are being decomposed the metal is activated by an acid liberated from the aluminum salt, e. g. hydrochloric acid. Another explanation may be that when soaking the preformed carrier particles the catalytic material is distributed more advantageously.

The catalyst pellets prepared as described are particularly suitable for use as a catalyst in the Claus process for the conversion of H₂S and SO₂ into sulfur. In the original Claus process H₂S was converted with the theoretically required quantity of air in the presence of bauxite. The process was later improved by carrying out the conversion in two steps, in the first of which one third of the H₂S is oxidized with the aid of sufficient air to H₂O and SO₂, and the remaining part of the H₂S is then reacted with the SO₂ and H₂O according to the following reactions.

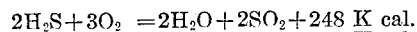
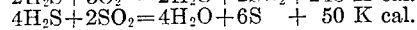
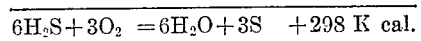

$$2H_2S + 3O_2 = 2H_2O + 2SO_2 + 248 \text{ K cal.}$$
$$4H_2S + 2SO_2 = 4H_2O + 6S + 50 \text{ K cal.}$$
$$\overline{6H_2S + 3O_2 = 6H_2O + 3S + 298 \text{ K cal.}}$$

In the improved process it is possible to carry out the first step under a steam boiler while the second step is effected in a Claus oven. It is also possible to pass the whole quantity of H₂S to be converted under the steam boiler, together with so much air that one third of the H₂S may be completely oxidized. A small excess of air (e. g. 5%) may be used to insure that little if any H₂S remains in the tail gas. Upon cooling the combustion gases, the H₂S reacts with the SO₂ formed with the formation of sulfur which is separated prior to passing the gases to a Claus oven.

The catalyst usually used in the Claus process is usually fragments of bauxite. However, bauxite is not very strong and after a short time it begins to powder. The powder greatly increases the pressure drop in the catalyst bed and pollutes the sulfur.

The pelleted alumina catalyst prepared as described above substantially avoids the difficulties encountered when using bauxite. Also, the catalyst has a high degree of activity, allowing equilibrium between H₂S and SO₂ to be attained at temperatures below 225° C. even at high gas velocities.

The invention will be illustrated by means of the following examples:

*Example I*

Surinam bauxite containing about 35% water of hydration was ground in a disintegrator. The resultant powder was kneaded with such an amount of a 16% aluminum chloride solution that a product was obtained containing 4.2% AlCl₃ based on the bauxite. The paste obtained was compressed into strands of 6 mm. diameter by means of an extrusion press.

The strands were dried in air at 20° C. for one day, heated to 120° C. in the course of 5 hours, and maintained at this temperature for 8 hours. The strands were then cut into pellets of 4 mm. The pellets obtained were heated to 500° C. in the course of 8 hours and maintained at this temperature for 2 hours. It was found that they could withstand a pressure of 15 kilograms.

The pellets were soaked in a solution of cobalt nitrate and ammonium molybdate. The quantities used were such that in the finished catalyst the weight ratio Al₂O₃:Mo:Co was equal to 100:6.5:0.8.

The pellets were dried at 120° C. and then heated to 370° C. in a stream of nitrogen for 2 hours.

The catalyst obtained was used for the vapor phase desulfurization of a Middle East gas oil which boiled between 260° and 350° C. and had a sulfur content of 1.27%. The oil was passed over the catalyst at the rate of 3 kg. per liter of catalyst per hour at 375° C., together with 1500 liters of hydrogen per kg. of oil under a pressure of 50 kg./cm.² The gas oil was desulfurized to an extent of 90–92%.

The desulfurization amounted to 83–85% when carried out in the known manner with a catalyst obtained by first calcining and grinding bauxite, treating the activated bauxite powder with hydrochloric acid, and subsequently soaking it in the solution of cobalt nitrate and ammonium molybdate, after which the mass obtained was dried to 120° C. and compressed into particles, which were calcined in the usual way.

*Example II*

Surinam bauxite containing 35% water of hydration was pulverized and kneaded with such a quantity of an aqueous solution of aluminum sulfate that the resultant paste contained 3.4% by weight of Al₂(SO₄)₃ based on the quantity of bauxite.

The paste was compressed into strands of 6 mm. diameter, which were dried at 20° C. for 8 hours, cut into small cylinders of 6–8 mm. length and then dried at 120° C. for 8 hours. Finally they were heated to 500° C. in the course of 2 hours and maintained at this temperature for 2 hours.

The strength of the pellets was determined by placing a pellet at right angles to its longitudinal axis between two small flat plates which were subjected to a certain pressure. The pressure at which the pellet collapsed was then measured. The average value obtained from 20 of these tests was 9 kg.

When placing 20 cm.³ of pellets in a cylindrical vessel with a bottom area of 6 cm.² and exerting a pressure on the pellets for three minutes by means of a small plate which fitted in the cylinder, it was found that the following quantities of powder were obtained in a series of experiments carried out at continually increasing pressures, in which for every successive test the powder already formed was added to the pellets:

| | Per cent by weight |
|---|---|
| After 3 minutes at a pressure of 10 kg. on 6 cm.² | 0.2 |
| After another 3 minutes, the pressure now being 20 kg. | 0.3 |
| After another 3 minutes, the pressure now being 30 kg. | 0.6 |
| After another 3 minutes, the pressure now being 60 kg. | 4 |
| After another 3 minutes, the pressure now being 100 kg. | 30 |

When the carrier was soaked in a solution of cobalt nitrate and ammonium molybdate in such a quantity that the final catalyst consisted of 100 parts by weight of $Al_2O_3$, 6.5 parts by weight of Mo and 0.8 parts by weight of Co, and was used under the same conditions as described in Example I, the oil was desulfurized to an extent of 88–89%.

*Example III*

If hydrogen sulfide gas containing, for instance, 99% by vol. of $H_2S$ is used as a fuel gas in a steam boiler, keeping a ratio of 5 parts by vol. of air per 2 parts by vol. of hydrogen sulfide, and the combustion gases are cooled, the sulfur formed being separated off at 150° C., a tail gas is obtained which may be further treated catalytically for the conversion of hydrogen sulfide. To this end this gas was passed at 230° C. under atmospheric pressure through a reactor in such a quantity that 9.8 litres $H_2S$, 4.9 litres $SO_2$, 86 litres N and 33 grams of steam flowed per hour over 500 millilitres of a pelleted catalyst.

84% of the $H_2S$ present was converted into sulfur and steam by the $SO_2$.

The catalyst pellets used had been prepared by mechanically kneading, for 15 minutes, 1000 g. of white Surinam powdered bauxite with a grain size of less than 420 microns, 8% by weight of the particles being larger than 210 microns and 50% smaller than 74 microns, with 77.8 g. $Al_2(SO_4)_3 \cdot 18 H_2O$ and 115 cc. water and subsequently compressing the paste obtained into strands of 6 mm. diameter, which were dried in the air for 1½ hours and then cut into 5 mm. pieces. These pieces were dried in the air for 8 hours, subsequently dried at 120° C. for 8 hours, gradually heated to 250° C. and kept at this temperature for 5 hours, after which they were heated up to 500° C. in two hours and maintained at this temperature for two hours.

The sulfur formed was removed from the gas mixture obtained in the first reactor. The remaining gas was then conducted under atmospheric pressure and at 220° C. through a second reactor in such a quantity that 1.56 litres $H_2S$, 0.78 litre $SO_2$, 86 litres $N_2$ and 40 grams of steam were passed per hour over 500 millilitres of the same catalyst used in the first oven. 70% of the $H_2S$ present was converted into S by the $SO_2$.

The total quantity of $H_2S$ converted in the first and the second reaction ovens was approximately 95%.

When in a second test the gas rates were doubled, the conversion percentages remained the same.

In connection with contamination of the atmosphere it is frequently essential that the remaining $H_2S$ and any sulfur mist left in the reaction gas after the gas—subsequent to passing through the last reactor for the conversion of $H_2S$ into sulfur—has been conducted through a sulfur condenser, should be converted into $SO_2$.

On leaving the sulfur condenser the gas has a temperature of 130–150° C. and consists of 0.3–1.5% by vol. of $H_2S$, 0.2–0.6% by vol. of S, calculated as $S_2$, both referred to wet gas, which further contains 0.2–1% by vol. of $SO_2$ and finally water vapor, nitrogen and $CO_2$.

This gas is admixed with an excess of 100–200% of air for the combustion of the $H_2S$ and the sulfur. In order to heat the gas mixture to a suitable temperature, fuel gas with a stoichiometric quantity of air may be added simultaneously with the air for the combustion of the $H_2S$ and S and the whole subjected to combustion to heat the total gas mixture to approximately 300–400° C. This combustion may, for example, be effected by means of a so-called line-burner.

The preheated gas may then be passed through a reaction space containing aluminum oxide referred to above, or another material with a large surface, which, if desired, may be impregnated with oxidation promoters such as vanadium-, nickel- and iron-oxide.

The rate at which the wet gas is passed through the reaction space may, for example, be in the neighborhood of 250–500 n cu.m./cu.m./hour.

The reaction in the after-combustion chamber may reduce the $H_2S$ content to 0.0001% by vol. calculated on dry gas, while nearly all the sulfur is oxidized at an after-combustion temperature of 400° C.

We claim as our invention:

1. Method for preparing aluminum oxide molded particles particularly suited for use in catalysis which comprises in combination the steps of grinding alumina trihydrate to a powder of grain size less than 0.5 mm. such that at least 5% by weight is of particle size larger than 210 microns and from 30 to 60% by weight is smaller than 74 microns, mixing the resultant powder of alumina trihydrate with between 1% and about 6% of a water soluble salt of aluminum and a strong acid and sufficient water between 12 and 20% by weight based on the hydrated alumina to form a paste, extruding said paste into formed pellets, drying said pellets and calcining them at a temperature of 200–300° C. until bound hydrate water substantially ceases to be set free and then at a temperature between 400 and 800° C. to obtain gamma alumina.

2. The method according to claim 1 further characterized in that said water soluble salt of aluminum and a strong acid is aluminum chloride.

3. The method according to claim 1 further characterized in that between 3% and about 6% of the water soluble salt of aluminum and a strong acid is applied.

4. The method according to claim 1 further characterized in that said alumina trihydrate is bauxite containing at least 30% of water.

5. The method according to claim 1 further characterized in that after said calcination the pellets are impregnated with cobalt nitrate and ammonium molybdate and then calcined to convert the said salts to the oxides.

WILLEM FREDERIK ENGEL.
PIETER KRIJGER.

References Cited in the file of this patent

UNITED STATES PATENTS

| Number | Name | Date |
|---|---|---|
| 2,123,224 | Baehr et al. | July 12, 1938 |
| 2,200,529 | Baehr et al. | May 14, 1940 |
| 2,441,297 | Stirnton | May 11, 1948 |
| 2,443,285 | Webb et al. | June 15, 1948 |
| 2,487,466 | Nahin | Nov. 8, 1949 |